(12) United States Patent
Morishita et al.

(10) Patent No.: US 8,018,503 B2
(45) Date of Patent: Sep. 13, 2011

(54) IMAGING APPARATUS WITH MULTIPLE TIMING-ADJUSTING PARTS

(75) Inventors: Akihiko Morishita, Hiratsuka (JP); Takafumi Toyoda, Chigasaki (JP); Daiki Ito, Tokyo (JP)

(73) Assignee: Nikon Corporation, Tokyo (JP)

( * ) Notice: Subject to any disclaimer, the term of this patent is extended or adjusted under 35 U.S.C. 154(b) by 656 days.

(21) Appl. No.: 12/007,757

(22) Filed: Jan. 15, 2008

(65) Prior Publication Data

US 2008/0198236 A1    Aug. 21, 2008

(30) Foreign Application Priority Data

Feb. 19, 2007    (JP) ................................. 2007-038297

(51) Int. Cl.
*H04N 5/76* (2006.01)
(52) U.S. Cl. ............. 348/231.6; 348/231.99; 348/231.9; 348/207.99
(58) Field of Classification Search ......................... None
See application file for complete search history.

(56) References Cited

U.S. PATENT DOCUMENTS

2005/0283582 A1* 12/2005 Aakjer ........................ 711/167

FOREIGN PATENT DOCUMENTS

JP      A-10-174048       6/1998

* cited by examiner

*Primary Examiner* — David L Ometz
*Assistant Examiner* — Angel L Garces-Rivera
(74) *Attorney, Agent, or Firm* — Oliff & Berridge PLC

(57) ABSTRACT

An imaging apparatus includes a nonvolatile memory storing multiple kinds of parameters, a volatile memory storing temporarily the parameters read out from the nonvolatile memory, a processing part executing a processing using the parameters stored in the volatile memory and a data controlling part reading out the parameters from the nonvolatile memory according to a provided clock and transferring the parameters to the volatile memory, and the imaging apparatus includes a first timing-adjusting part outputting a first clock for reading out a part of the multiple kinds of parameters stored in the nonvolatile memory to the data controlling part, when the imaging apparatus is powered on, and a second timing-adjusting part outputting a second clock for reading out another part of the multiple kinds of parameters stored in the nonvolatile memory to the data controlling part, while the imaging apparatus is preparing for image shooting.

15 Claims, 3 Drawing Sheets

IMAGING APPARATUS WITH MULTIPLE TIMING-ADJUSTING PARTS

CROSS-REFERENCE TO RELATED APPLICATION

This application is based upon and claims the benefit of priority from Japanese Patent Application No. 2007-038297, filed on Feb. 19, 2007, the entire contents of which are incorporated herein by reference.

BACKGROUND

1. Field

The present invention relates to an imaging apparatus such as a digital camera.

2. Description of the Related Art

In an imaging apparatus exemplified by recent digital cameras, a diversified, fast and sophisticated processing is requested in image processing parts of the imaging apparatus with increased number of pixels and increased data amount to be dealt with, and further with fast readout speed of image data from the imaging devices.

In order to meet these requirements, a variety of digital correction processing blocks have been proposed, and the number of the digital correction processing blocks has ever been increasing. Also, parameters (setting values and the like) for driving each digital correction processing block have ever been increasing similarly.

There is a problem that nonvolatile memories used for storing these parameters (setting values and setting information) in the imaging apparatus are comparatively large-sized and expensive. Meanwhile, the imaging apparatus itself is required to be smaller and lighter as a whole. As a proposal to compromise these issues, Japanese Unexamined Patent Application Publication No. H10-174048 (patent reference 1), for example, discloses that parameters (image attribute information) are stored in a serial EEPROM which is a small-sized and inexpensive memory.

However, in a case of using the serial EEPROM disclosed in the patent reference 1, there is a concern that it takes a long time to write in and read out parameters of image attribute information or the like resulting in causing delay in image processing or the like, compared with a case of using a nonvolatile memory with parallel outputs.

SUMMARY

The present invention aims to provide an imaging apparatus capable of high speed processing even when using a memory with a comparatively slow readout speed like a serial EEPROM.

For example, the present invention intends to realize a real time image processing by configuring a clock output to be able to read out a parameter (setting value or the like) from a serial EEPROM in such a time zone not to affect an image-shooting sequence or an imaging-shooting operation of an imaging apparatus.

An imaging apparatus of the present invention includes a nonvolatile memory storing multiple kinds of parameters, a volatile memory storing temporarily the parameter read out from the nonvolatile memory, a processing part executing a processing using the parameter stored in the volatile memory and a data controlling part reading out the parameter from the nonvolatile memory according to a provided clock and transferring the parameter to the volatile memory, and the imaging apparatus includes a first timing-adjusting part outputting a first clock for reading out a part of the multiple kinds of parameters stored in the nonvolatile memory to the data controlling part, when the imaging apparatus is powered on, and a second timing-adjusting part outputting a second clock for reading out another of the multiple kinds of parameters stored in the nonvolatile memory to the data controlling part, while the imaging apparatus is preparing for image shooting.

Here, a CPU provided in the imaging apparatus preferably includes a third timing-adjusting part outputting a third clock for reading out a part of the multiple kinds of parameters stored in the nonvolatile memory to the data controlling part.

Also preferably, the nonvolatile memory stores the parameter necessary for an image-shooting operation and the parameter necessary for image processing, and the first clock is a clock for reading out the parameter necessary for the image-shooting operation from the nonvolatile memory and the second clock is a clock for reading out the parameter necessary for the image processing from the nonvolatile memory.

Also, the CPU preferably rewrites the parameter stored in either one of the nonvolatile memory and the volatile memory according to a setting indication when the setting indication is input from an external interface part provided in the imaging apparatus.

Also, the third timing-adjusting part preferably outputs the third clock for reading out the parameter necessary for a setting to the data controlling part when a setting indication is input from an operating part provided in the imaging apparatus.

Also, timing when the second timing-adjusting part outputs the second clock to the data controlling part is preferably timing when a release switch provided in the imaging apparatus is half-pressed.

Also preferably, the second timing-adjusting part has a function generating a clock to be provided both to image data obtained by an image-shooting and to a correcting processing part for correction-processing the image data, other than a function generating the second clock, and the first timing-adjusting part has a smaller size than the second timing-adjusting part.

Also preferably, the nonvolatile memory stores at least the parameter necessary for the image-shooting operation, and the third clock is a clock for reading out the parameter necessary for the image-shooting operation from the nonvolatile memory.

Also preferably, the nonvolatile memory is a serial EEPROM, and the volatile memory is an SRAM.

DETAILED DESCRIPTION OF THE EMBODIMENTS

Figure 1:
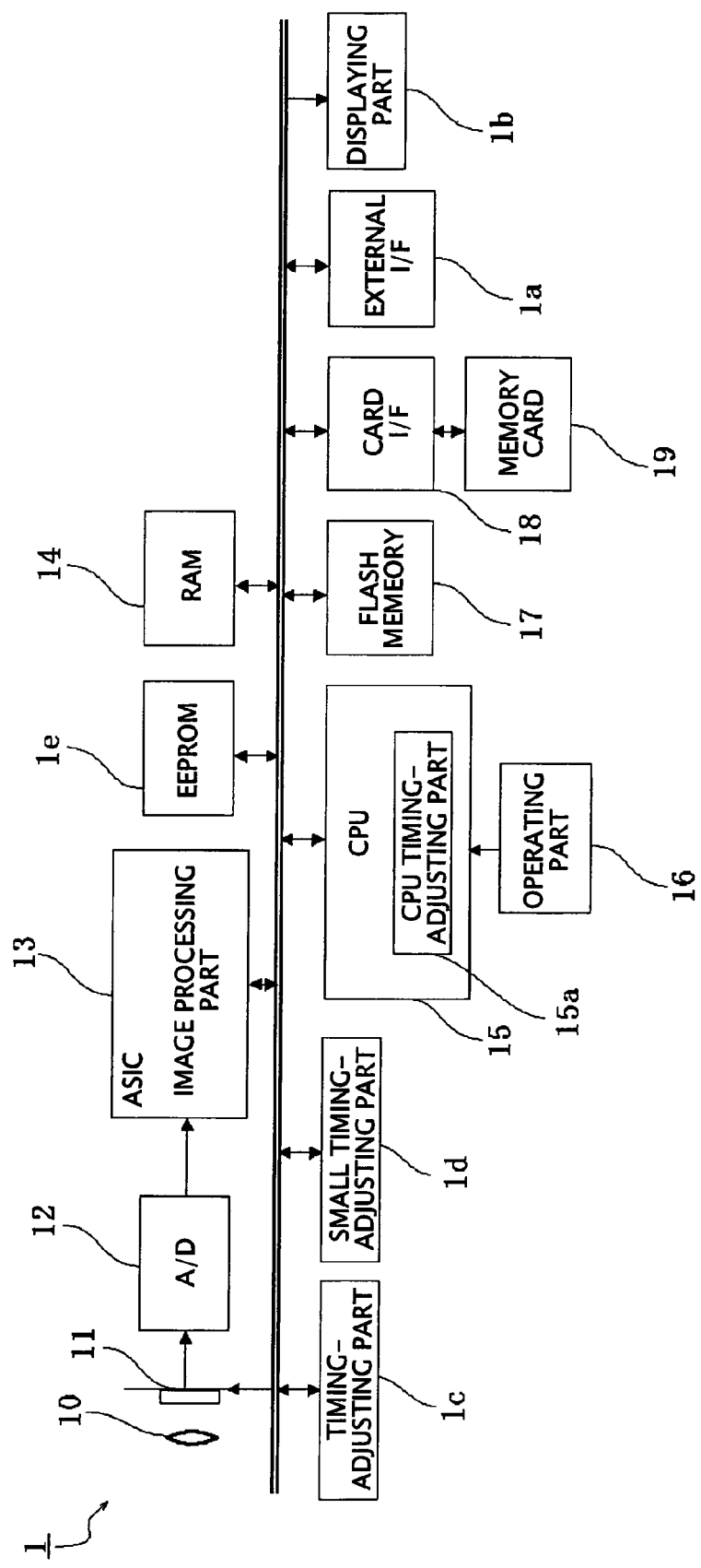
FIG. 1 is a block diagram showing an imaging apparatus according to an embodiment of the present invention.

FIG. 1 is a diagram showing schematically a configuration of an imaging apparatus 1, regarding an imaging apparatus according to an embodiment of the present invention. Light from an object to be imaged is collected by a lens 10 and imaged by an imaging device 11. Image data obtained by the imaging device 11 is transformed into digital image data sequentially via an analog front-end (AFE, not shown in the drawing) and an A/D converting part 12, and input into an image processing part 13 including an ASIC and the like.

The image processing part 13 carries out computations regarding various image processings such as a high-pass filter processing, a noise suppression processing, etc. according to indications from a central processor, CPU 15. Image data processed in the image processing part 13 is stored in a RAM 14 as needed. The RAM 14 may be configured as an external memory, and a storage capacity of the RAM 14 is a storage capacity for storing one image frame, for example, in the present embodiment.

Also, all the processings within the imaging apparatus 1 depend on indications from the CPU 15, and operating signals from an operating part 16 for carrying out operations such as various setting operations and a release switch (not shown in the drawing) are input into the CPU 15. Also, an image processing-program and the like for the image processing in the image processing part 13 are stored in a flash memory 17 in advance, and read out as required for the processing.

Also, various parameters necessary for the image processing are stored in a serial EEPROM 1e. A clock from a timing-adjusting part 1c, a small size timing-adjusting part 1d, or a CPU timing-adjusting part 15a is input into the serial EEPROM 1e as needed, and the parameter stored in that is read out.

The timing-adjusting part 1c provides a clock to image data obtained by the imaging device 11 and also inputs a system clock into the image processing part 13, both for enabling the image processing part 13 to perform image processing. Also, the timing-adjusting part 1c outputs the system clock to the image processing part 13, on receiving from the CPU 15 a signal generated when the release switch (not shown in the drawing) is half-pressed at image shooting. The system clock is a clock for reading out the parameter regarding image processing necessary for the image shooting from the serial EEPROM 1e.

The small timing-adjusting part 1d outputs a small timing clock to the image processing part 13, when the imaging apparatus 1 is powered on. The small timing clock is a clock for reading out from the serial EEPROM 1e the parameter at least necessary for image-shooting operation of the imaging apparatus 1. Also, the small timing-adjusting part 1d continues operation, for example, even when the imaging apparatus 1 is in a stand-by state or the like and the image processing part 13 is in a non-operating state, and also the image processing part 13 is partially in a power-off state. Therefore, by utilizing the small timing clock of the small timing-adjusting part 1d, it is possible to access the serial EEPROM 1e at a required timing and to read out the parameter (setting information or the like) stored in the serial EEPROM 1e as required.

The CPU timing-adjusting part 15a provided in the CPU 15 outputs a main CPU clock to the image processing part 13, when a setting indication such as an image shooting mode or the like is input from the operating part 16. The main CPU clock is a clock for reading out the parameters (various setting parameters or the like) necessary for the setting from the serial EEPROM 1e.

That is, in the present embodiment, three trigger sources for reading out the parameters from the serial EEPROM 1e are the timing-adjusting part 1c, the small timing-adjusting part 1d, and the CPU timing-adjusting part 15a. This enables reading out necessary minimum setting parameters from the serial EEPROM only at a required timing according to a driving situation of the imaging apparatus 1.

Also, the imaging apparatus 1 can store various kinds of electronic information, image data and the like regarding image processing in a memory card 19 or the like via a card interface 18.

Also, the imaging apparatus 1 can read out image data, a program or the like within the imaging apparatus 1 to an external medium via an external interface 1a, and write image data, a program or the like sent from the external interface 1a into each part of the imaging apparatus 1.

On this occasion, the imaging apparatus 1 also can input and set various parameters regarding image correction into the image processing part 13 by use of the main CPU clock of the CPU timing-adjusting part 15a. Further, the imaging apparatus 1 can input and set the parameters into the serial EEPROM 1e by use of the main CPU clock of the CPU timing-adjusting part 15a.

This enables so-called firm-up or the like, that is, upgrade, update, or the like of the parameters to be provided by service centers. Therefore, it is possible to use the imaging apparatus 1 by setting the latest parameters at maintenance for coping with a secular change.

Also, a displaying part 1b can display image data on a screen for a photographer to confirm an image and also display necessary processing information or a menu.

Figure 2:
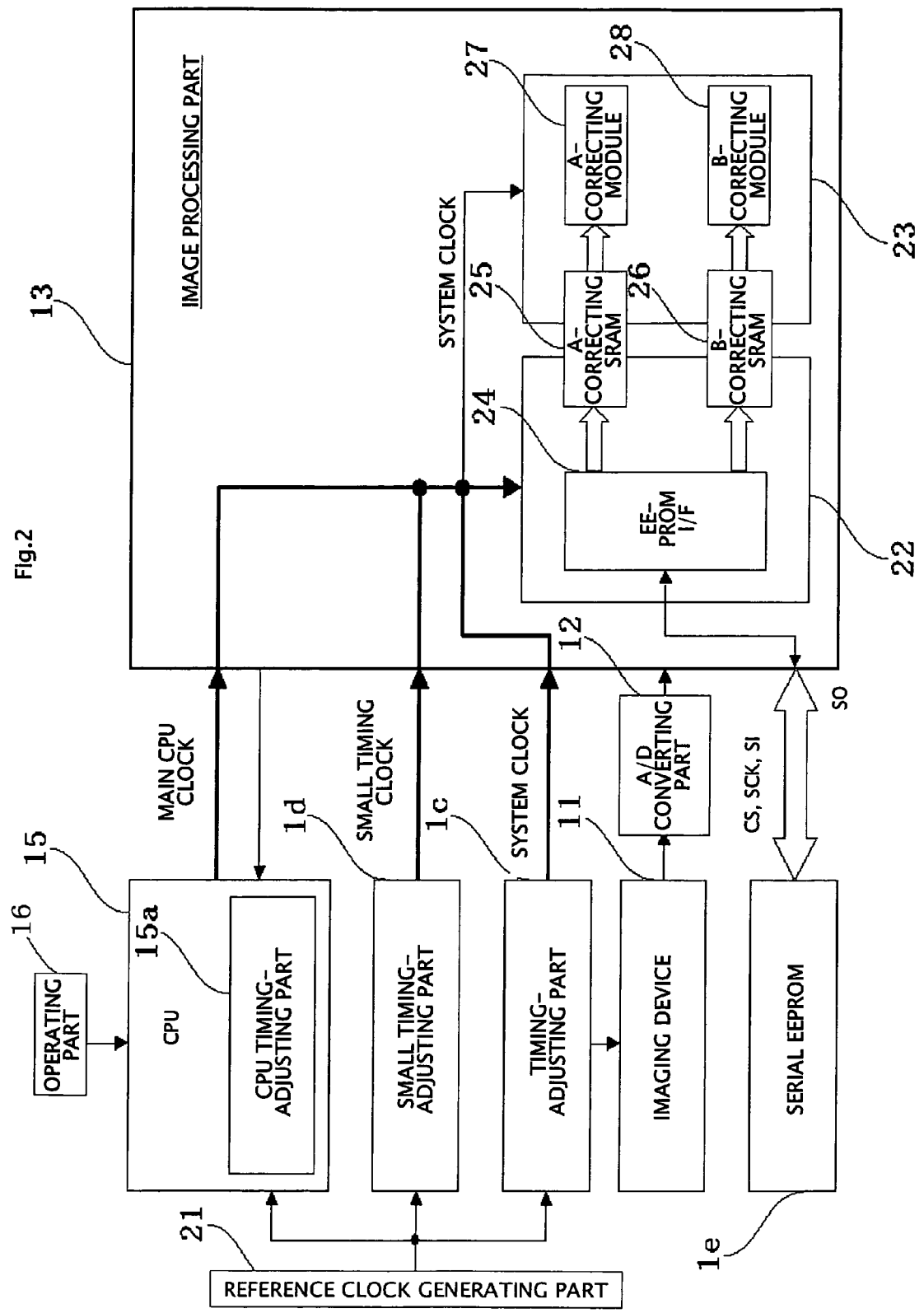
FIG. 2 is a schematic block diagram showing a configuration concept according to the embodiment of the present invention.

Next, the configuration of the imaging apparatus according to the present invention will be described hereinafter further in detail with reference to FIG. 2. FIG. 2 is a schematic block diagram according to the embodiment of the present invention. A reference clock generating part 21 provided in the imaging apparatus 1 is a reference clock source of the whole imaging apparatus and generates clocks. The generated clocks are provided to the CPU 15, small timing-adjusting part 1d, and timing-adjusting part 1c, and become clocks for reading out the parameters from the serial EEPROM 1e, respectively. Here, the reference clock generating part 21 may be provided independently to each of multiple timing-adjusting parts, and may be shared by part of or all the multiple timing-adjusting parts.

The CPU 15, on receiving a setting indication of image-shooting mode or image-shooting parameter setting indication from the operating part 16, makes the CPU timing-adjusting part 15a output a main CPU clock to the data controlling part 22 for reading out the parameter (correcting data or the like) necessary for the setting from the serial EEPROM 1e.

Also, the CPU 15 can write a parameter (image shooting parameter) indicated by the operating part 16 directly into a volatile memory such as an A-correcting SRAM 25, or a B-correcting SRAM 26 in the image processing part 13. That is, the CPU 15 can set a parameter (correcting data or the like) except for the parameter stored in the serial EEPROM 1e in advance into the image processing part 13. Also, the CPU 15 can perform rewriting or version up of the parameter (correcting data or the like) by accessing the serial EEPROM 1e according to an indication input via the external interface (not shown in the drawing) or the like.

The small timing-adjusting part 1d outputs the small timing clock to the data controlling part 22. The small timing clock is a clock for reading out the parameter (operating coefficient, or the like) necessary for an image shooting operation from the serial EEPROM 1e. Here, a correction processing part 23 may be powered off to set the imaging apparatus 1 to a power saving mode, if it is not a time to obtain image data.

The timing-adjusting part 1c provides a system clock to image data when the image data is taken out of the imaging device 11, outputs the system clock to the data controlling part 22, and further outputs the system clock to the correction processing part 23 for the correction processing part 23 to perform image correction.

The main CPU clock output from the CPU timing-adjusting part 15a, the small timing clock output from the small timing-adjusting part 1d, and the system clock output from the timing-adjusting part 1c become, when input into the data controlling part 22, clocks (SCK or the like) for reading out the parameters from the serial EEPROM 1e via an EEPROM interface 24. On this occasion, a readout signal for specifying a device to be read out (CS: Chip Select) and a command signal for specifying requested data (SI: Serial Input) are also input into the serial EEPROM 1e.

The parameter read out from the serial EEPROM 1e according to such a clock is recorded as a serial output (SO: Serial Output) in the volatile memory, the A-correcting SRAM 25 or the B-correcting SRAM 26, via the EEPROM interface 24.

In a case in which the parameter recorded in the A-correcting SRAM 25 or the B-correcting SRAM 26 is the correcting data, the parameter is used for correction processing in an A-correcting module 27 or a B-correcting module 28. In this embodiment, storing the correcting data in advance into the A-correcting SRAM 25 or the B-correcting SRAM 26 before image data is obtained from the imaging device 11 makes it possible to start image correction quickly after the image data has been obtained.

Also, a block of the parameters (correcting data) for each correction processing, each correcting mode, or the like may be stored in the serial EEPROM 1e, in a case in which the imaging apparatus 1 is requested to carry out a plurality of image corrections.

Also, it is possible to power off the timing-adjusting part 1c, while operating the small timing-adjusting part 1d, during a period when image data is not yet obtained in a case in which the imaging apparatus 1 is in a state just after powered-on or in a state of standing by. Even in this case, it is possible to read out the correcting data into the A-correcting SRAM 25 or the B-correcting SRAM 26 by use of the small timing clock from the small timing-adjusting part 1d, preparing for obtaining the next image data. Also, it is possible similarly to read the correcting data by use of the main CPU clock into the A-correcting SRAM 25 or the B-correcting SRAM 26.

Here, the parameters capable of input from the operating part 16 may include mode identifying information about exposure correction, white balance correction and gamma correction (contrast adjustment or the like), and various setting coefficients regarding those image corrections. Also, the parameters to be stored in the serial EEPROM 1e may include preliminary information for image correction, an exposure coefficient, setting values necessary for clamp correction, shading correction, etc., and also a setting value necessary for a case in which the imaging device is exchanged, or default values thereof. Also, the parameters may be stored in the serial EEPROM 1e as a look-up table.

Further, as parameters necessary for a preliminary operation before release read out by the clock signal from the small timing-adjusting part 1d, basic setting values such as an AE (Automatic Exposure) setting value, an AF (Auto Focus) setting value, and a gain setting value may be stored in the serial EEPROM 1e.

Also, the small timing-adjusting part 1d may output a clock for operating another small module such as a display device (rear liquid crystal panel and the like) which is not directly related with the imaging device 11 or the image processing part 13. Also, a plurality of small timing-adjusting parts 1d may be provided for processing functions, respectively, and only one small timing-adjusting part may be powered on when the function thereof is being used, while the other small timing-adjusting parts are powered off for power saving.

Further, the parameters (setting values) may be set by use of the clock from the CPU 15 in a case in which there is an enough time margin in an imaging apparatus sequence, for example, in a long second (more than several seconds) image shooting, the control is carried out by use of the clock from the small timing-adjusting part 1d in a case in which there is not an enough time margin, for example, when the imaging apparatus has been just powered on, and the serial EEPROM 1e may be accessed by use of the clock from the timing-adjusting part 1c during an image shooting interval in a normal image shooting situation.

Also, the clock for controlling access to the serial EEPROM 1e from the small timing-adjusting part 1d or the timing-adjusting part 1c may be generated multiple divided times in time sharing. Thereby, it is possible to prevent the operation from being delayed without disturbing an image shooting operation even when the imaging apparatus sequence is in operation.

Figure 3:
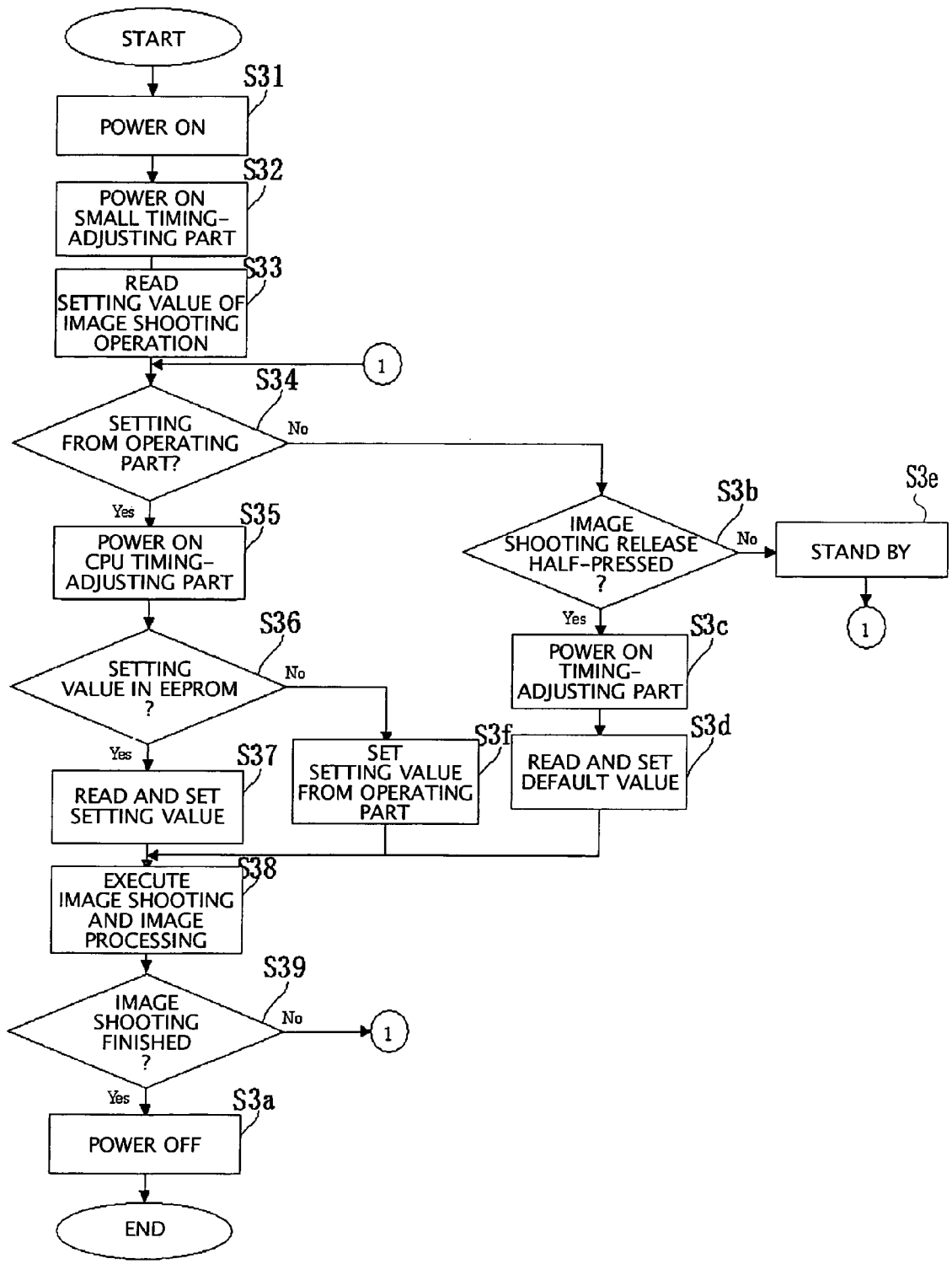
FIG. 3 is a flow chart showing an operation according to the embodiment of the present invention.

Although this embodiment can be developed and applied in various ways as described above, a typical example thereof will be described in detail with reference to FIG. 3 as follows. FIG. 3 shows an operation flow of the imaging apparatus conceptually.

Step 31

When the imaging apparatus 1 is powered on, the process goes to Step 32.

Step 32

At the same time when the imaging apparatus 1 is powered on, the small timing-adjusting part 1d is first powered on to be able to output the small timing clock.

Step 33

Next, the data controlling part 22 is also powered on, and the parameter (setting value) necessary for an image shooting operation is read in from the serial EEPROM 1e by the small timing clock via the EEPROM interface 24. Further, the read-in parameter (setting value) is stored in the volatile memory such as the A-correcting SRAM 25 or the B-correcting SRAM 26, by the EEPROM interface 24.

Step 34

Here, if a setting indication of the image-shooting mode or the image-shooting parameter is input from the operating part 16, the process goes to Step 35. If not, the process goes to Step 3b.

Step 35

The CPU timing-adjusting part 15a is powered on for reflecting the setting indication from the operating part 16 to the image processing part 13.

Step 36

Then, whether the parameter (setting value or the like) necessary for the setting requested by the operating part 16 is stored in the serial EEPROM 1e is determined. If stored, the process goes to Step 37, and, if not stored, the process goes to Step 3f.

Step 37

The imaging apparatus 1 reads in the parameter (setting value) stored in the serial EEPROM 1e by the main CPU clock via the EEPROM interface 24, and stores the parameter into the volatile memory such as the A-correcting SRAM 25 or the B-correcting SRAM 26.

Step 38

An image shooting operation is carried out. Image data taken out of the imaging device 11 is subjected to a correction processing by the correction processing part 23 by use of the parameter (correcting data) stored in the above mentioned volatile memory. In this case, a correcting block or a correcting module may be provided for each category or each kind of correction, and a group of correcting data corresponding to each of the module or the like may be stored in the serial EEPROM 1e.

Step 39

If the image shooting finished, the process goes to Step 3a. If not finished, the process returns to Step 34.

Step 3a

When the imaging apparatus 1 is powered off, the CPU timing-adjusting part 15a, the small timing-adjusting part 1d, and the timing-adjusting part 1c are also powered off, and stored contents of the volatile memory such as the A-correcting SRAM 25 or the B-correcting SRAM 26 are lost by initialization.

Step 3b

The imaging apparatus 1 determines whether the release switch is half-pressed for indicating a trigger to start an image shooting operation. If half-pressed, the process goes to Step 3c, and, if not half-pressed, the process goes to Step 3e.

Step 3c

The timing-adjusting part 1c is powered on and the imaging apparatus 1 stands by for reading image data and processing thereafter. On this occasion, the correction processing part 23 is also powered on.

Step 3d

The imaging apparatus 1 reads in a default setting value of the parameter stored in the serial EEPROM 1e by the system clock via the EEPROM interface 24, and stores the default setting value into the volatile memory such as the A-correcting SRAM 25 or the B-correcting SRAM 26. Then, the process goes to Step 38.

Step 3e

The imaging apparatus 1, if the release is not half-pressed, goes into a stand-by state in which image data is not yet obtained, the process returns to Step 34. In the stand-by state, the imaging apparatus 1 preferably keeps a power saving mode by powering off either one or both of the timing-adjusting part and the CPU timing-adjusting part.

Step 3f

The imaging apparatus 1 stores and sets the parameter (setting values or the like) for reflecting the setting indication input from the operating part 16 into the volatile memory such as the A-correcting SRAM 25 or the B-correcting SRAM 26 by use of the main CPU clock of the CPU timing-adjusting part 15a. This updates the parameter (correcting data) developed and stored in the volatile memory such as the A-correcting SRAM 25 or the B-correcting SRAM 26.

The above operations allow a suitable parameter (correcting parameter or the like) according to an image shooting situation to be developed into a volatile memory at a necessary timing and to be used for image processing.

Note that, in this embodiment, a nonvolatile memory is an EEPROM (Electronically Erasable and Programmable Read Only Memory), for example, and defined to be a memory which can erase and rewrite data electronically, and store and hold the data. The EEPROM can rewrite data electronically at a higher voltage than usual, but there is a limitation to the number of rewritings and all the stored contents need to be erased once for rewriting. Also, partial rewriting is not possible.

Also, instead of the EEPROM, a flash memory or the like may be used for the configuration and other nonvolatile memories may be also used. When configuring with the flash memory, it is possible to realize a memory with a small size and high impact resistance. Further, a memory card which mounts a flash memory in a card, a USB memory which combines a flash memory with a USB connector or the like may be used.

Also, the nonvolatile memory is preferably a serial junction type device which realizes an inexpensive and space-saving small memory. Also, using a serial EEPROM, it is possible to reduce influence of noise from each bit, and to read out and write data securely. Further, preferably, control of data becomes easy by use of the serial EEPROM. For connecting the serial EEPROM, RS-232C, RS-422, IrDA, USB, IEEE 1394, or the like may be used.

Also, the volatile memory may be a so-called cash memory or a memory configured by use of flip-flop circuits. The volatile memory is typically a SRAM (Static Random Access Memory), but not limited to the SRAM.

Also, a selecting part may be provided in the image processing part 13 for switching a clock input into the image processing part 13 among a clock from the CPU timing-adjusting part 15a, a clock from the small timing-adjusting part 1d, and a clock from the timing-adjusting part 1c, according to an image shooting situation. The selecting part may have inputs of a clock selection rule or a selection indicating signal from the CPU 15.

According to the present invention described hereinabove, readout of parameters from a nonvolatile memory to a volatile memory is carried out in a plurality of divided timings other than carried out at the same time, and thereby each readout time becomes shorter. Therefore, it is possible to start an image processing quickly after an image shooting.

Accordingly, the present invention can be applied widely to an imaging apparatus such as a digital camera or a copy machine which performs a digital image processing of an image data obtained by an imaging device.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging apparatus that includes:
   a nonvolatile memory storing multiple kinds of parameters;
   a volatile memory storing temporarily the parameter read out from said nonvolatile memory;
   a processing part executing a processing using the parameter stored in said volatile memory; and
   a data controlling part reading out the parameter from said nonvolatile memory according to a provided clock and transferring the parameter to said volatile memory, and
   said imaging apparatus comprising:
   a first timing-adjusting part outputting a first clock for reading out a part of the multiple kinds of parameters stored in said nonvolatile memory to said data controlling part, when said imaging apparatus is powered on; and
   a second timing-adjusting part outputting a second clock for reading out another part of the multiple kinds of parameters stored in said nonvolatile memory to said data controlling part, while said imaging apparatus is preparing for image-shooting, wherein:

said nonvolatile memory stores the parameter necessary for an image-shooting operation and the parameter necessary for image processing, said first clock is a clock for reading out the parameter necessary for said image-shooting operation from said nonvolatile memory, and said second clock is a clock for reading out the parameter necessary for said image processing from said nonvolatile memory and is a same clock as a clock to be provided to image data obtained by image-shooting.

2. The imaging apparatus according to claim 1, wherein said imaging apparatus further includes a central processor, and said central processor comprises a third timing-adjusting part outputting a third clock for reading out a part of the multiple kinds of parameters stored in said nonvolatile memory to said data controlling part.

3. The imaging apparatus according to claim 2, wherein said central processor rewrites the parameters stored in either one of said nonvolatile memory and said volatile memory according to a setting indication when the setting indication is input from an external interface part provided in said imaging apparatus.

4. The imaging apparatus according to claim 2, wherein said third timing-adjusting part outputs the third clock for reading out the parameter necessary for a setting to said data controlling part when a setting indication is input from an operating part provided in said imaging apparatus.

5. The imaging apparatus according to claim 1, wherein timing when said second timing-adjusting part outputs said second clock to said data controlling part is timing when a release switch provided in said imaging apparatus is half-pressed.

6. The imaging apparatus according to claim 2, wherein said second timing-adjusting part has a function generating said clock to be provided both to the image data obtained by the image-shooting and to a correction processing part for correction-processing the image data, other than a function generating said second clock, and a circuit size of said first timing-adjusting part is smaller than a circuit size of said second timing-adjusting part.

7. The imaging apparatus according to claim 2, wherein said nonvolatile memory stores at least the parameter necessary for the image-shooting operation, and said third clock is a clock for reading out the parameter necessary for said image-shooting operation from said nonvolatile memory.

8. The imaging apparatus according to claim 1, wherein said nonvolatile memory is a serial EEPROM, and said volatile memory is an SRAM.

9. The imaging apparatus according to claim 2, wherein said nonvolatile memory is a serial EEPROM, and said volatile memory is an SRAM.

10. The imaging apparatus according to claim 3, wherein said nonvolatile memory is a serial EEPROM, and said volatile memory is an SRAM.

11. The imaging apparatus according to claim 4, wherein said nonvolatile memory is a serial EEPROM, and said volatile memory is an SRAM.

12. The imaging apparatus according to claim 5, wherein said nonvolatile memory is a serial EEPROM, and said volatile memory is an SRAM.

13. The imaging apparatus according to claim 6, wherein said nonvolatile memory is a serial EEPROM, and said volatile memory is an SRAM.

14. The imaging apparatus according to claim 7, wherein said nonvolatile memory is a serial EEPROM, and said volatile memory is an SRAM.

15. The imaging apparatus according to claim 1, wherein the parameter necessary for the image-shooting operation is transferred to the volatile memory using the first clock when the imaging apparatus is powered on or in a standby state, and the parameter necessary for the image processing is transferred to the volatile memory using the second clock before the image data is obtained by image-shooting.

* * * * *